(12) United States Patent
Xie et al.

(10) Patent No.: US 6,453,093 B2
(45) Date of Patent: Sep. 17, 2002

(54) TUNABLE OPTICAL DISPERSION-SLOPE COMPENSATION BASED ON A NONLINEARLY-CHIRPED BRAGG GRATING

(75) Inventors: Yong Xie, Freemont; Sanggeon Lee, Union City; Zhongqi Pan; Alan E. Willner, both of Los Angeles, all of CA (US)

(73) Assignee: Univerisity of Southern California, Los Angeles, CA (US)

(*) Notice: Subject to any disclaimer, the term of this patent is extended or adjusted under 35 U.S.C. 154(b) by 32 days.

(21) Appl. No.: 09/757,414

(22) Filed: Jan. 8, 2001

Related U.S. Application Data

(60) Provisional application No. 60/175,146, filed on Jan. 7, 2000.

(51) Int. Cl.$^7$ ................................................. G02B 6/34
(52) U.S. Cl. ........................... 385/37; 385/24; 385/122
(58) Field of Search ................................. 385/24, 1–12, 385/37–43, 122; 372/6, 27, 64, 96, 102; 359/188, 290

(56) References Cited

U.S. PATENT DOCUMENTS

| | | | |
|---|---|---|---|
| 5,450,427 A | 9/1995 | Fermann et al. | |
| 5,499,134 A | 3/1996 | Galvanauskas et al. | |
| 5,511,083 A | 4/1996 | D'Amato et al. | |
| 5,532,868 A | 7/1996 | Gnauck et al. | |
| 5,541,947 A | 7/1996 | Mourou et al. | |
| 5,633,885 A | 5/1997 | Galvanauskas et al. | |
| 5,675,674 A | 10/1997 | Weis | |
| 5,808,779 A | 9/1998 | Weis | |
| 5,978,131 A | 11/1999 | Lauzon et al. | |
| 5,982,963 A | 11/1999 | Feng et al. ................... | 385/37 |
| 5,999,546 A | 12/1999 | Espindola et al. | |
| 5,999,671 A | 12/1999 | Jin et al. | |
| 6,014,480 A | 1/2000 | Baney | |
| 6,081,640 A | 6/2000 | Ouellette et al. ............. | 385/37 |
| 6,148,127 A | 11/2000 | Adams et al. ................ | 385/37 |
| 6,330,383 B1 * | 12/2001 | Cai et al. ...................... | 385/37 |

FOREIGN PATENT DOCUMENTS

GB    WO 99/22255    5/1999

OTHER PUBLICATIONS

J.L. Cruz et al., *Fibre Bragg gratings tuned and chirped using magnetic fields*, Electronic Letters, Jan. 30$^{th}$ 1997, vol. 33, No. 3, pp. 235–236.

Ronald D. Esman, *Microwave/Analog Technology*, cleo '97 Technical Digest, paper CWN1, pp. 293, 1997.

J.L. Arce–Diego et al., *Fiber Bragg grating as an optical filter tuned by a magnetic field*, Optics Letters, May 1, 1997, vol. 22, No. 9, pp. 603–605.

R. J. Nuyts, *Performance Improvement of 10 Gb/s Standard Fiber Transmission System by Using the SPM Effect in the Dispersion Compensating Fiber*, IEEE Photonics Technology Letters, Oct. 1996. vol. 8, No. 10, 1406–1408.

Morten Ibsen et al., *Sinc–Sampled Fiber Bragg Gratings for Identical Multiple Wavelength Operation*, IEEE Photonics Technology Letters, Jun. 1998, vol. 10, No. 6, pp. 842–844.

M. Tomizawa et al., *Nonlinear influence on PM–AM conversion measurement of group velocity dispersion in optical fibres*, Electronic Letters, Aug. 18$^{th}$ 1994, vol. 30, No.17, pp. 1434–1435.

W.F. Liu and P.St. J. Russel et al., *Improved Efficiency Narrow–Band Acoustooptic Tunable Reflector using Fibre Bragg Grating*, Optoelectronics (1997).

* cited by examiner

Primary Examiner—Phan T. H. Palmer
(74) Attorney, Agent, or Firm—Fish & Richardson P.C.

(57) ABSTRACT

Techniques for using a nonlinearly-chirped fiber Bragg grating to produce tunable dispersion-slope compensation.

14 Claims, 6 Drawing Sheets

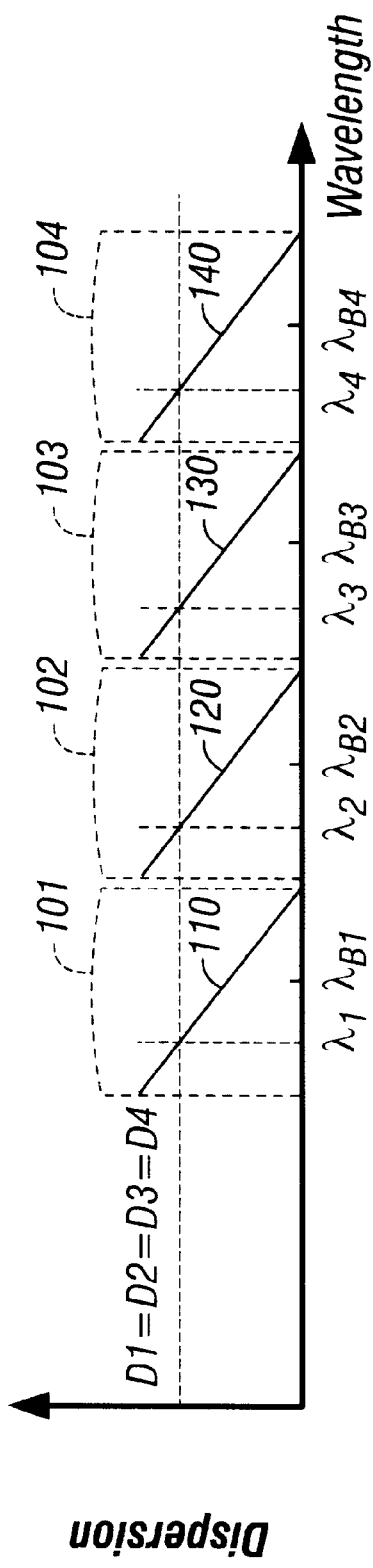
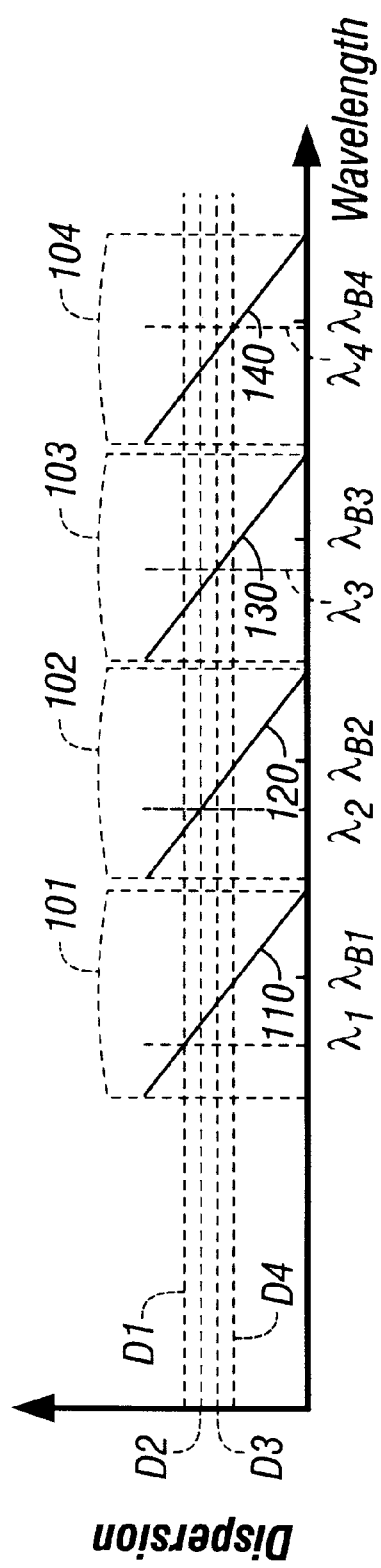
FIG. 1
FIG. 2

TUNABLE OPTICAL DISPERSION-SLOPE COMPENSATION BASED ON A NONLINEARLY-CHIRPED BRAGG GRATING

This application claims the benefit of U.S. Provisional Application No. 60/175,146, filed on Jan. 7, 2000.

TECHNICAL FIELD

This application relates to compensation for optical dispersion, and more specifically, to techniques and systems for reducing chromatic dispersion in optical media such as optic fiber links.

BACKGROUND

Many optical fibers and other optical transmission media can exhibit chromatic dispersion when different spectral components at different wavelengths in an optical signal travel at different speeds. An optical pulse, which comprises different optical spectral components, therefore, can be broadened or distorted in shape after propagation through a distance in such a dispersive optical medium. This dispersion effect can be undesirable and even adverse for certain applications such as optical communication systems where information is encoded, processed, and transmitted through optical pulses. The pulse broadening caused by the dispersion can limit the transmission bit rate, the transmission bandwidth, and other performance factors of the optical communication systems.

One way to mitigate the chromatic dispersion in dispersive optical fibers and other optical transmission media is dispersion compensation which introduces dispersion in an optical signal to negate the dispersion accumulated in that optical signal. In a wavelength-division multiplexed (WDM) optical systems, multiple WDM optical channels at different wavelengths are simultaneously transmitted through a fiber system. Since the dispersion in different WDM channels may be different, it may be desirable to provide different amounts of dispersion compensation to different WDM channels at the same time. In addition, since the dispersion in the WDM channels may vary over time, it may also be desirable to adjust the dispersion compensation in time for different WDM channels.

SUMMARY

One embodiment of the present disclosure includes a fiber grating formed in a fiber and configured to have a spatial grating pattern that changes nonlinearly along the fiber to exhibit up to at least a third-order nonlinear dispersion effect so as to produce a tunable dispersion slope. A grating control unit may be coupled to the fiber grating and is operable to adjust a grating parameter of the fiber grating to tune both dispersion and dispersion slope produced by the fiber grating.

BRIEF DESCRIPTION OF THE DRAWINGS

FIGS. 1 and 2 illustrate two different modes of operation in a sampled nonlinearly-chirped fiber grating.

DETAILED DESCRIPTION

Figure 3:
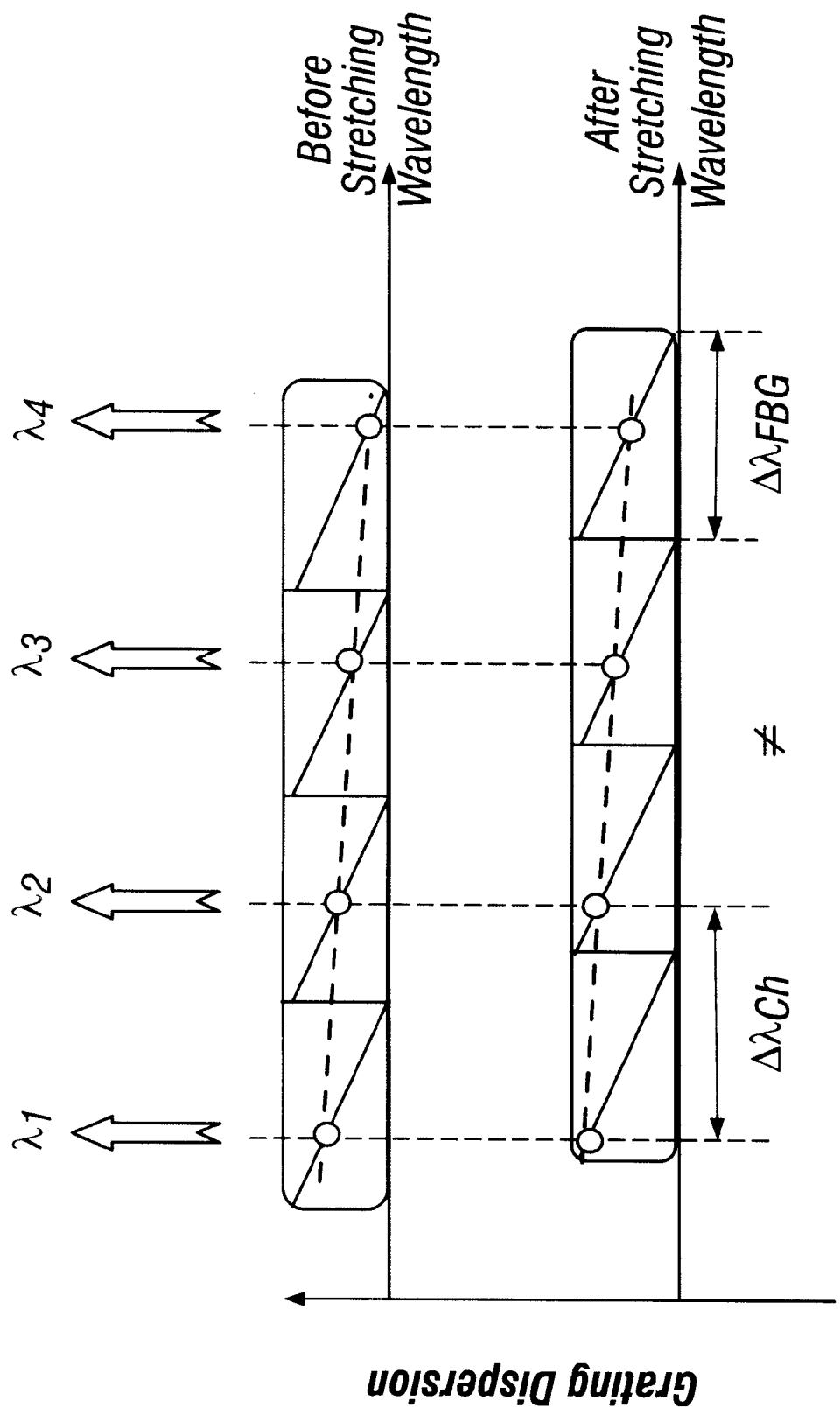
FIG. 3 illustrates dispersion slope compensation with a fixed dispersion slope but tunable amount of dispersion based on the second order nonlinear chirp effect.

The techniques of this disclosure are based on nonlinearly-chirped Bragg gratings. See, U.S. Pat. No. 5,982,963 to Feng et al. A nonlinearly-chirped Bragg grating is a grating that is formed along an optical waveguide such as an optical fiber and has a grating parameter $n_{neff}(z)\Lambda(z)$ that changes nonlinearly with the position z along the fiber optic axis, where $n_{neff}(z)$ is the effective index of refraction and $\Lambda(z)$ is the period of the grating. In general, each of $n_{neff}(z)$ and $\Lambda(z)$ may vary with the position z along the fiber. One way to implement a nonlinearly-chirped grating parameter $n_{neff}(z)\Lambda(z)$, for example, is to modulate the amplitude or phase of the refractive index of the fiber.

In operation, this nonlinearly-chirped grating reflects optical waves satisfying a Bragg condition of $\lambda(z)=2n_{neff}(z)\Lambda(z)$. Hence, different spectral components are reflected back at different positions in grating to produce different group delays, $\tau_g$, which is a function of z and $\lambda$:

$$\tau_g = \tau_g(z,\lambda). \qquad (1)$$

A single Bragg reflection band centered at a center wavelength $\lambda_0$ can be generated and the bandwidth, $\Delta\lambda_{FBG}$, is determined by the chirping range of the grating parameter $n_{neff}(z)\Lambda(z)$ One distinct feature of the nonlinearly-chirped grating is that, the relative group delays for different spectral components at different wavelengths are different, that is, the dispersion D of the grating is a function of the wavelength and is tunable by adjusting the grating parameter $n_{neff}(z)\Lambda(z)$. For example, a fiber grating may be stretched or compressed to adjust its overall length to change the relative group delays of different reflected spectral components.

The nonlinear chirp in the grating parameter can be used to cause the grating dispersion, D, to vary with the wavelength:

$$D(\lambda) = D^{(1)}(\lambda_0) + D^{(2)}(\lambda_0)(\lambda - \lambda_0) + D^{(3)}(\lambda_0)(\lambda - \lambda_0)^2 + \qquad (2)\ldots$$

where $D^{(1)}(\lambda_0)$ is the linear dispersion of the grating, $D^{(2)}(\lambda_0)$, $D^{(3)}(\lambda_0)$, and other terms represent nonlinear dispersion terms of the grating caused by the nonlinear chirping. The dispersion slope with respect to wavelength, hence, can be written as:

$$slope = \frac{\partial D(\lambda)}{\partial \lambda} = D^{(2)}(\lambda_0) + 2D^{(3)}(\lambda_0)(\lambda - \lambda_0) + \ldots \qquad (3)$$

The $2^{nd}$ order nonlinear dispersion $D^{(2)}(\lambda_0)$ provides a constant dispersion slope for all different spectral components, the $3^{rd}$ order nonlinear dispersion $D^{(3)}(\lambda_0)$ (or other high order nonlinear dispersion) provides a varying dispersion slope that changes with wavelength. The following describes techniques that use one or more such nonlinear dispersion effects to produce tunable dispersion at multiple wavelengths.

A nonlinearly-chirped grating can be sampled to produce multiple Bragg reflection bands at multiple center wavelengths. See, e.g., U.S. patent application Ser. No. 09/253, 645 by Jin-Xing Cai et al now U.S. Pat. No. 6,330,383. In essence, a spatial sampling pattern is also formed in the fiber to overlap with the underlying nonlinearly-chirped grating structure. The sampling pattern has a sampling period greater than the varying grating period $\Lambda(z)$ and may also be spatially chirped. The coupling of the nonlinearly-chirped grating and the sampling pattern produces multiple Bragg reflection windows or bands at different wavelengths. The number of bands and the band spacing are determined by the modulation of the spatial sampling pattern. The bandwidth of each band is determined by the chirping range of the grating parameter $n_{neff}(z)\Lambda(z)$.

FIG. 1 illustrates the dispersion of four adjacent Bragg reflection bands 101, 102, 103, and 104 produced by a sampled nonlinearly-chirped grating that are centered at wavelengths $\lambda_{B1}$, $\lambda_{B2}$, $\lambda_{B3}$, and $\lambda_{B4}$, respectively. Curves 110, 120, 130, and 140 are essentially identical and represent the dispersion curves of the Bragg reflection bands 101, 102, 103, and 104 according to Eq.(2). This sampled nonlinearly-chirped grating can be used to simultaneously control the dispersion at multiple WDM channels by placing different WDM channels into different Bragg reflection bands in the wavelength domain. As illustrated by the example in FIG. 1, four adjacent WDM channels $\lambda_1$, $\lambda_2$, $\lambda_3$, and $\lambda_4$ are respectively fit into the different Bragg reflection bands 101, 102, 103, and 104.

If each different WDM channel were located at the same relative spectral position from the center of the respective Bragg reflection band as with other WDM channels, then the dispersion produced at different channels would be the same (e.g., D1=D2=D3=D4) because the dispersion curves in different bands are essentially the same. When the grating is stretched or compressed or otherwise tuned by controlling the grating parameter $n_{neff}(z)\Lambda(z)$, although the dispersions of spectral components within each WDM channel are changed, the overall dispersions of different WDM channels are changed by approximately the same amount (e.g., D1'=D2'=D3'=D4'). This result may be undesirable in some applications because the dispersions of different WDM channels may be different and hence need to be compensated differently. In particular, different WDM channels, after transmission through some fiber systems, may accumulate different fiber dispersion slopes in additional to different dispersions.

A sampled nonlinearly-chirped fiber grating, when properly designed, can produce both tunable dispersion and tunable dispersion slope for different WDM channels. First, the fiber grating is designed to place different WDM channels at different spectral positions with respect to the respective centers of the different Bragg reflection bands. Secondly, the nonlinear chirp of the fiber grating is designed to produce the third-order dispersion $D^{(3)}(\lambda_0)$ or higher order nonlinear dispersion effects.

FIG. 2 shows an example of the first condition where 4 different WDM channels $\lambda_1$, $\lambda_2$, $\lambda_3$, and $\lambda_4$ are at 4 different positions relative to the respective band centers to produce different dispersions: D1≠D2≠D3≠D4. When the input WDM channels are evenly spaced in the wavelength domain, this condition can be achieved by using sampled nonlinearly-chirped grating with evenly-spaced Bragg reflection bands that has a band spacing $\Delta\lambda_{FBG}$ different from the channel spacing $\Delta\lambda_{Ch}$. Alternatively, the sampling pattern of the grating may be designed to produce Bragg reflection bands that are not uniformly spaced in the wavelength domain to have a varying band spacing that change from channel to channel.

Figure 4:
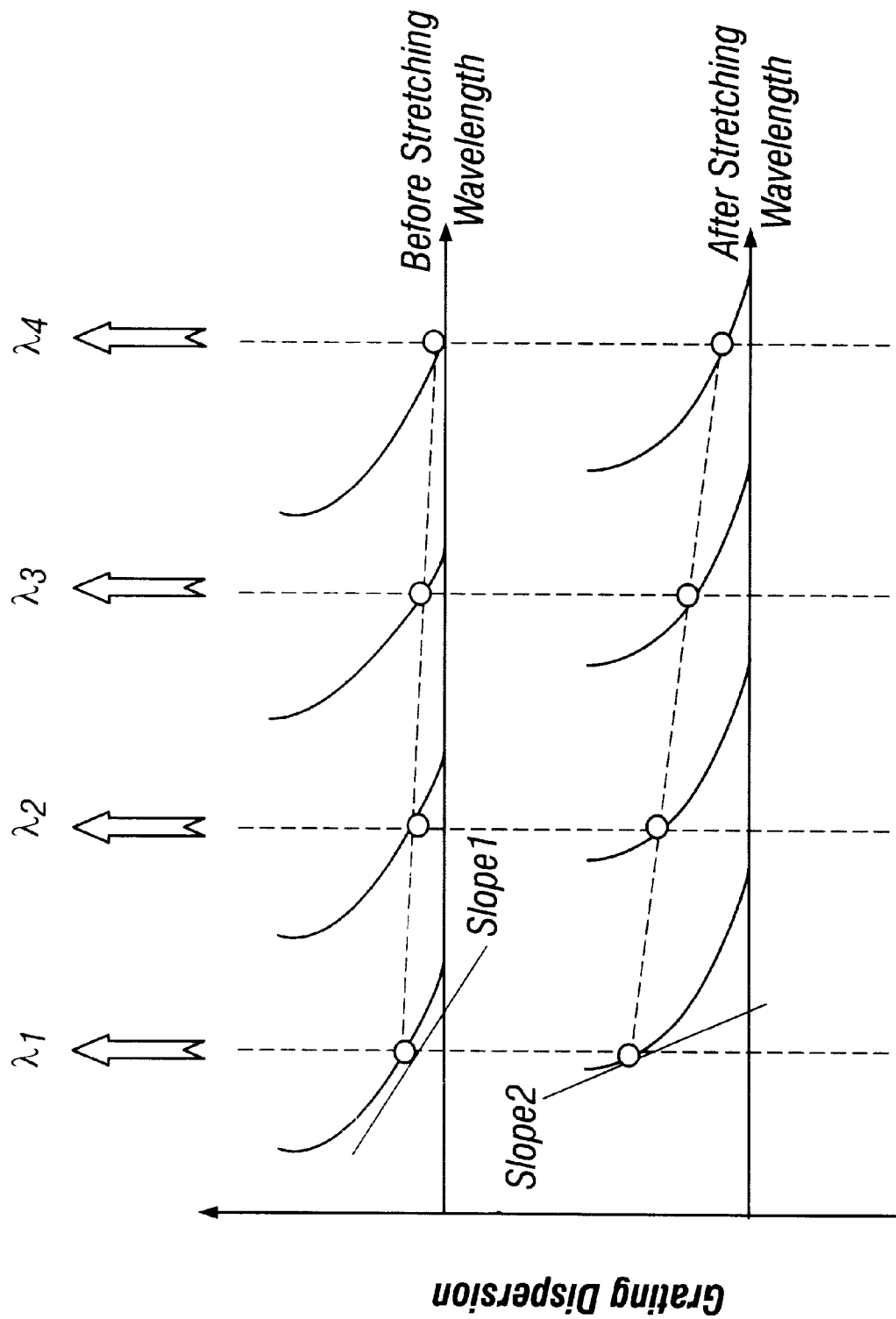
FIG. 4 illustrates tunable dispersion slope compensation based on the third or higher order nonlinear chirp effect.

The second condition is illustrated by FIGS. 3 and 4 where different nonlinearly-chirped dispersion terms in the above sampled fiber grating are shown to produce different effects on the tunability of dispersion.

The first nonlinear term, the $2^{nd}$ order nonlinear dispersion $D^{(2)}(\lambda_0)$ represents a constant dispersion slope for all wavelengths. When the nonlinear chirp of the fiber grating is specifically designed to primarily exhibit the $D^{(2)}(\lambda_0)$ effect and the higher nonlinear dispersion effects are negligible, the dispersion curve in the wavelength domain represented by Eq.(2) is a liner curve with a constant dispersion slope. Hence, as illustrated in FIG. 3, when the fiber grating is stretched or compressed, the Bragg reflection band positions are shifted in the wavelength domain. This shifts the dispersion produced on each channel. When the relative positions of different channels with respect to respective band centers are different, the total dispersions at different channels are different. The dispersion slope for different channels, however, remains as a constant. Therefore, the $D^{(2)}(\lambda_0)$ effect can be used to produce a tunable dispersion with a constant dispersion slope. The dispersion slope is independent of the stretch or compression and is not tunable.

In contrast, the $D^{(3)}(\lambda_0)$ effect or higher nonlinear effects can provide not only a tunable dispersion as by the $D^{(2)}(\lambda_0)$ effect but also a tunable dispersion slope as indicated by Eq.(3). FIG. 4 illustrates the operation of the tunable dispersion slope by the $3^{rd}$ order or higher order nonlinear effect. Notably, the grating dispersion is now a nonlinear curve due to the $D^{(3)}(\lambda_0)$ effect or higher nonlinear chirp effects. As a result, when the fiber grating is stretched or compressed, the dispersion at each channel changes due to the shifts of the reflection bands. In addition, the dispersion slope changes with the fiber stretching or compression. The $D^{(3)}(\lambda_0)$ effect or higher nonlinear chirp effects hence can be used to adjust the dispersion slope produced by the fiber grating to negate the varying dispersion slope accumulated in a received WDM channel after transmission through a dispersive fiber system.

Figure 5:
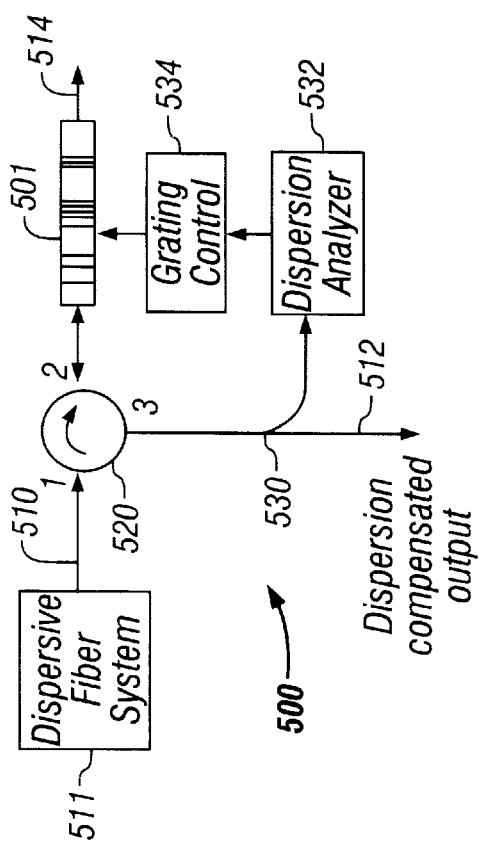
FIG. 5 shows one embodiment of a tunable dispersion slope compensator.

FIG. 5 shows one example of a dispersion-slope compensator 500 for a WDM system based on a sampled nonlinearly-chirped fiber grating 501. The input port 1 of the circulator 520 is coupled to receive an input signal 510 of multiple WDM channels from a dispersive WDM fiber system 511. An optical coupler or a beam splitter 530 is used to tap a small fraction of the reflected signal 512 with multiple channels for dispersion measurements in a dispersion monitor device 532. The device 532 measures the dispersion and the dispersion slope in the reflected channels and produces a dispersion indicator. A grating control 534 is coupled to control the nonlinearly-chirped grating parameter nΛ as a function of the position z. In addition, the control 534 is operable to control the grating parameter nΛ according to the dispersion monitor from the device 532. A number of implementations of the grating control 534 are described in U.S. Pat. No. 5,982,963 to Feng et al., including a fiber stretcher engaged to the fiber grating and a control circuit that supplies a control signal to the fiber stretcher to vary the total length of the fiber. As the dispersion in the input signal 510 varies, the device 500 can respond to the changing dispersion in the fiber system 511 by dynamically adjusting the nonlinearly-chirped sampled grating 501 accordingly to change the amount of dispersion and associated dispersion slope for each reflected WDM channel.

Figure 6A:
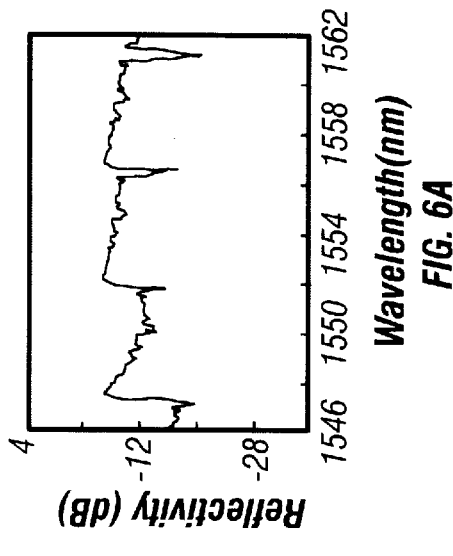
FIGS. 6A, 6B, 7, 8A, 8B, 9A, and 9B show measured data from a 3-channel sampled nonlinearly-chirped fiber grating.
Figure 7:
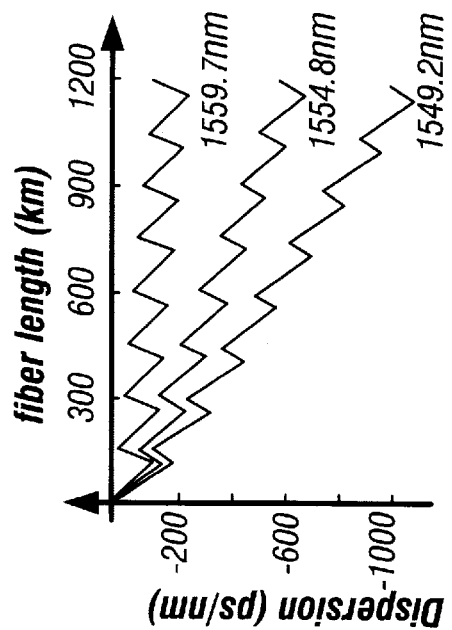
Figure 6B:
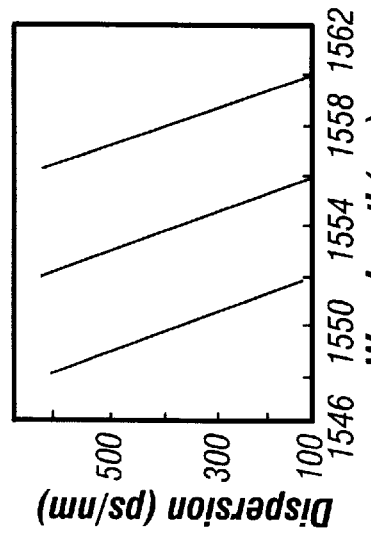

A 3-channel sampled nonlinearly-chirped grating was used to demonstrate the above dispersion slope compensation. FIGS. 6A and 6B show the measured reflection bands and dispersion of the grating, respectively. The band spacing $\Delta\lambda_{FBG}$ of the three Bragg reflection bands is about 4 nm. Three dispersive optical channels at 1559.7 nm, 1554.8 nm, and 1549.2 nm with a channel spacing $\Delta\lambda_{Ch}$ of about 5 nm were generated with a pseudorandom bit stream (PRBS) $2^{15}-1$ and modulated at a bit rate of 10 Gb/s. FIG. 7 shows the dispersion map of the optical channels at different travel distances in a dispersive fiber line.

Figure 8A:
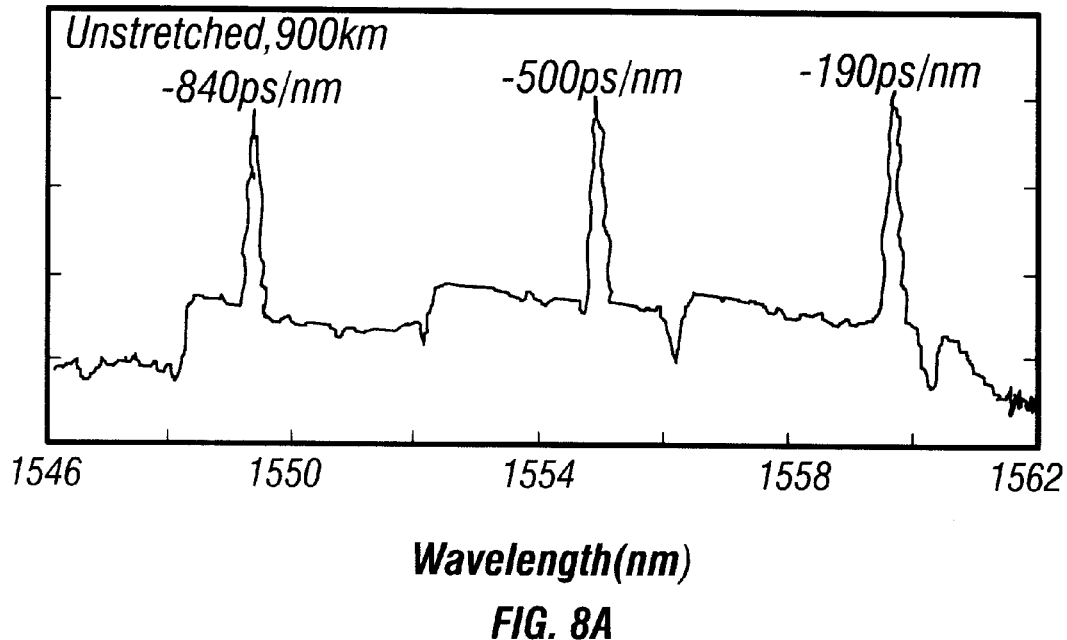
Figure 8B:
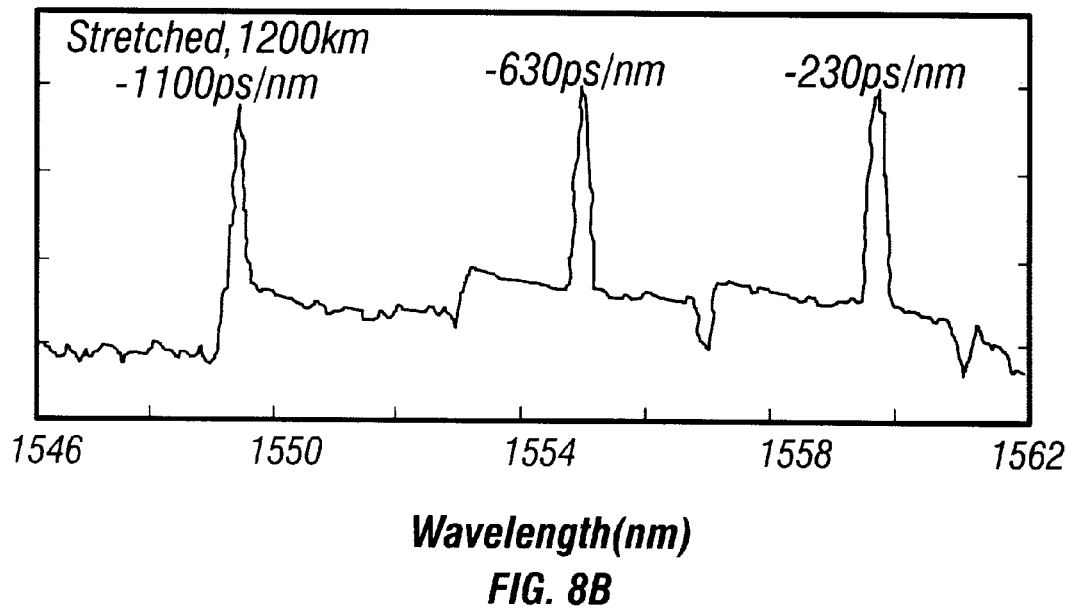
Figure 9B:
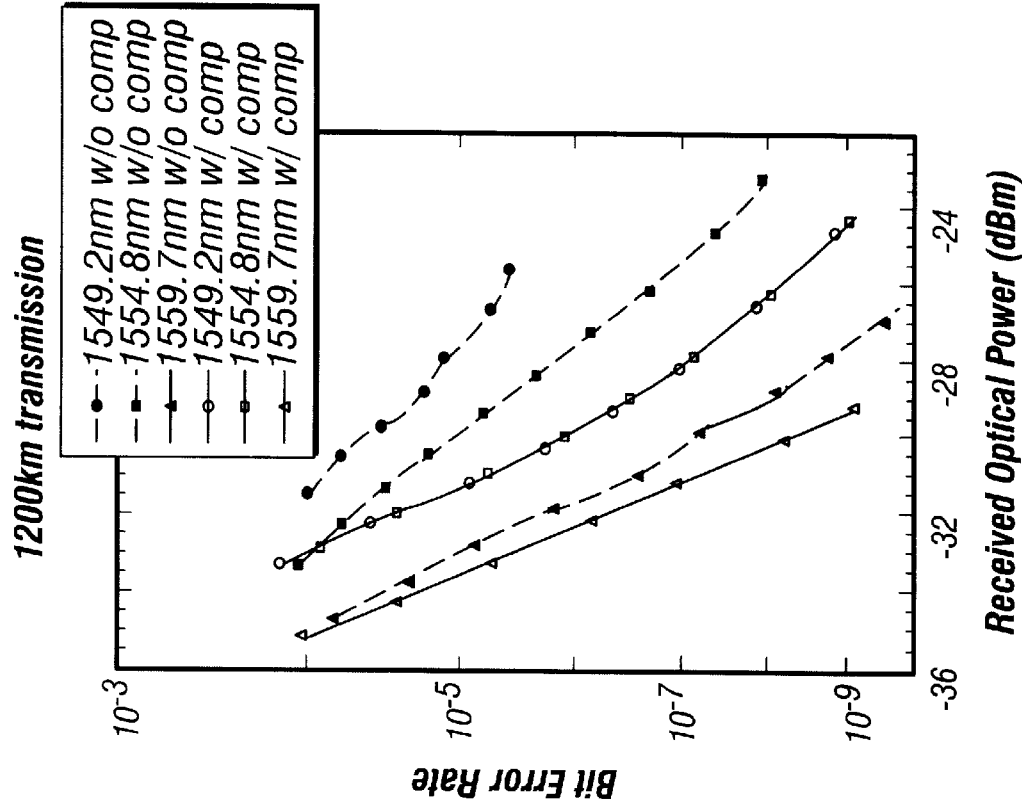
Figure 9A:
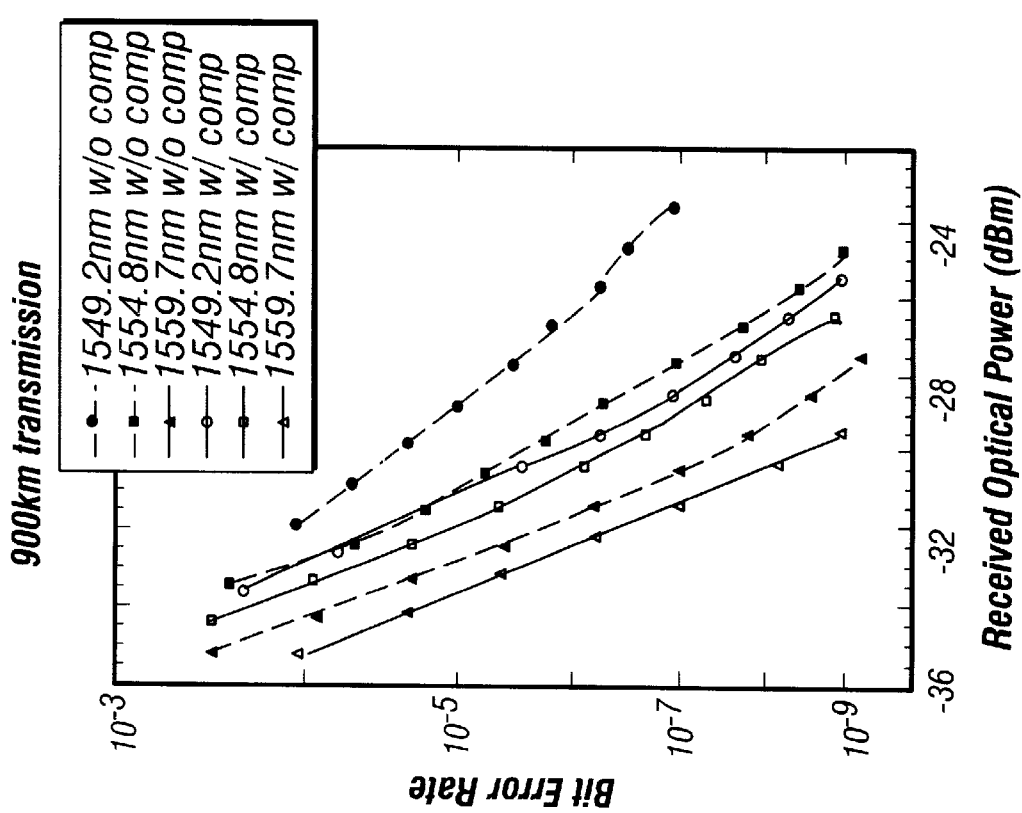

FIG. 8A show compensated output channels from the fiber grating after the channels transmitted through a 900-km dispersive fiber-line. When the transmission fiber line was increased to 1200 km to add additional dispersion to the transmitted channels, the fiber grating was stretched to increase the grating dispersion by shifting each Bragg reflection band by about 0.8 nm. FIG. 8B shows the compensated output channels. FIGS. 9A and 9B respectively show the measured bit error rates. The measurements show that the 3-channel grating is used to produce a high dispersion compensation for the most severely dispersed channel at 1549.2 nm and a low dispersion for the 1559.7 nm channel close to the zero-dispersion wavelength for the fiber line.

Therefore, sampled nonlinearly-chirped fiber gratings may be designed to have desired nonlinear chirp and band spacing to allow sensitive dispersion tuning of dispersion at different channels. The third or higher order nonlinear effects of such gratings can be used to further improve the tuning sensitivity. In real fiber systems where the zero dispersion wavelength is usually allocated near the center of the transmission band, two sampled nonlinearly-chirped gratings with opposite dispersions may be used to compensate for channels below and above the zero dispersion wavelength, respectively. Hence, an optical filter may be used to separate the input channels and direct the proper channels to proper gratings for compensation.

Although the present disclose only includes a few examples, it is understood that various modifications and enhancements may be made without departing from the following claims.

What is claimed is:

1. A system, comprising:
   a fiber grating formed in a fiber and configured to have a spatial grating pattern that changes nonlinearly along said fiber to exhibit up to at least a third-order nonlinear dispersion effect so as to produce a tunable dispersion slope; and
   a grating control unit coupled to said fiber grating and operable to adjust a grating parameter of said fiber grating to tune both dispersion and dispersion slope produced by said fiber grating.

2. The system as in claim 1, wherein said grating control unit includes a fiber stretcher that changes a length of said fiber grating.

3. The system as in claim 1, wherein said fiber grating further includes a spatial sampling pattern that is formed in said fiber to overlap and modulate said spatial grating pattern to produce multiple Bragg reflection bands at different band center frequencies each with a tunable dispersion slope.

4. The system as in claim 3, wherein said spatial sampling pattern is selected to produce a band spacing between adjacent Bragg reflection bands that is different from a channel spacing between adjacent channels in multiple wavelength-division multiplexed (WDM) channels.

5. The system as in claim 3, wherein said spatial sampling pattern is selected to produce a band spacing between adjacent Bragg reflection bands that changes from channel to channel.

6. A system, comprising:
   a fiber having a receiving end to a plurality of wavelength-division multiplexed (WDM) optical channels with a constant channel spacing in wavelength;
   a fiber grating formed in said fiber and configured to have a spatial grating pattern that changes nonlinearly along said fiber to exhibit up to at least a third-order nonlinear dispersion effect and a spatial sampling pattern that overlaps with and modulates said spatial grating pattern to produce a plurality of Bragg reflection bands centered at different band center wavelengths that are spaced differently from said constant channel spacing, said fiber grating operable to produce a dispersion slope in each Bragg reflection band that is adjustable when a grating parameter is changed; and
   a grating control unit coupled to said fiber grating and operable to adjust said grating parameter of said fiber grating to tune both dispersion and said dispersion slope produced by said fiber grating.

7. The system as in claim 6, wherein said Bragg reflection bands are evenly spaced from one another.

8. The system as in claim 6, wherein said Bragg reflection bands have a varying band spacing.

9. The system as in claim 6, wherein said grating control unit includes a fiber stretcher that changes a length of said fiber grating.

10. The system as in claim 6, further comprising a dispersion detection unit that is operable to measure dispersion and dispersion slope of each optical channel reflected by said fiber grating, wherein said grating control unit is operable to adjust said fiber grating in response to said measurement.

11. A method, comprising:
    providing a fiber grating formed in a fiber and configured to have a spatial grating pattern that changes nonlinearly along said fiber to exhibit up to at least a third-order nonlinear dispersion effect and a spatial sampling pattern that overlaps with and modulates said spatial grating pattern to produce a plurality of Bragg reflection bands centered at different band center wavelengths, said fiber grating operable to produce a dispersion slope in each Bragg reflection band that is adjustable when a grating parameter is changed;
    directing multiple optical channels into said fiber grating where channel wavelengths of different optical channels are respectively in different Bragg reflection bands and are respectively positioned differently with respect to respective band center wavelengths;
    adjusting a grating parameter of said fiber grating to change dispersion slopes differently at respective different channel wavelengths to negate different dispersions and different dispersion slopes with respect wavelength in different channels.

12. The method as in claim 11, wherein said grating parameter includes a length of said fiber grating.

13. The method as in claim 11, further comprising:
    measuring a change in dispersions and dispersion slopes of in said optical channels reflected from said fiber grating; and
    further adjusting said grating parameter accordingly to negate said change in said dispersions and said dispersion slopes.

14. The method as in claim 11, wherein said optical channels transmit through a dispersive fiber system before entering said fiber grating, wherein dispersions and dispersion slopes of said dispersive fiber system are different for different channels and change over time.

* * * * *

UNITED STATES PATENT AND TRADEMARK OFFICE
CERTIFICATE OF CORRECTION

PATENT NO.    : 6,453,093 B1
DATED         : September 17, 2002
INVENTOR(S)   : Yong, Xie et al.

It is certified that error appears in the above-identified patent and that said Letters Patent is hereby corrected as shown below:

<u>Column 1,</u>
Before "TECHNICAL FIELD", please insert the following:

-- STATEMENT AS TO FEDERALLY SPONSORED RESEARCH
This invention was made with government support under Contract No. EEC-9529152 awarded by the National Science Foundation and Contract No. MDA 904-99-C-2630 awarded by the Department of Defense. The government has certain rights in this invention. --

Signed and Sealed this

Fourth Day of March, 2003

JAMES E. ROGAN
*Director of the United States Patent and Trademark Office*